US009697108B2

(12) United States Patent
Ligman et al.

(10) Patent No.: US 9,697,108 B2
(45) Date of Patent: Jul. 4, 2017

(54) SYSTEM, METHOD, AND APPARATUS FOR AUTOMATIC RECORDING AND REPLAYING OF APPLICATION EXECUTIONS

(71) Applicant: International Business Machines Corporation, Armonk, NY (US)

(72) Inventors: Joseph W. Ligman, Wilton, CT (US); Marco Pistoia, Amawalk, NY (US); John Ponzo, Yorktown Heights, NY (US); Gegi Thomas, Piermont, NY (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 13/964,296

(22) Filed: Aug. 12, 2013

(65) Prior Publication Data

US 2015/0046909 A1 Feb. 12, 2015

(51) Int. Cl.
*G06F 9/44* (2006.01)
*G06F 11/00* (2006.01)
*G06F 11/36* (2006.01)

(52) U.S. Cl.
CPC .................. *G06F 11/3688* (2013.01)

(58) Field of Classification Search
CPC .................................... G06F 11/3688
USPC ................................. 717/131, 130
See application file for complete search history.

(56) References Cited

U.S. PATENT DOCUMENTS

| | | | | |
|---|---|---|---|---|
| 5,596,714 A | * | 1/1997 | Connell | G06F 11/3688 714/38.1 |
| 5,657,438 A | * | 8/1997 | Wygodny | G06F 11/263 714/1 |
| 6,029,257 A | * | 2/2000 | Palmer | 714/40 |
| 6,857,120 B1 | * | 2/2005 | Arnold et al. | 717/157 |
| 7,721,264 B2 | * | 5/2010 | Peterson | G06F 9/4446 717/109 |
| 8,024,706 B1 | * | 9/2011 | Krauss | 717/124 |
| 9,213,625 B1 | * | 12/2015 | Schrage | G06F 11/3688 |
| 2001/0047510 A1 | * | 11/2001 | Angel et al. | 717/4 |
| 2005/0071760 A1 | | 3/2005 | Jaeger | |
| 2007/0047924 A1 | * | 3/2007 | Eklund et al. | 386/125 |
| 2007/0169055 A1 | * | 7/2007 | Greifeneder | 717/158 |
| 2009/0133000 A1 | * | 5/2009 | Sweis et al. | 717/124 |

(Continued)

OTHER PUBLICATIONS

John, "Objective-C: Categories" Jul. 1, 2008, Mac Developer Tips (macdevelopertips.com), archived Aug. 20, 2008 at https://web.archive.org/web/20080820094110/http://macdevelopertips.com/objective-c/objective-c-categories.html.*

(Continued)

*Primary Examiner* — James D Rutten
(74) *Attorney, Agent, or Firm* — Harrington & Smith

(57) ABSTRACT

A method comprises receiving data pertaining to a recorded interaction between a test device operating system and an application on a test device, the recorded interaction being based on a user input; compiling the data pertaining to the recorded interaction in a script compiler, the data comprising human-readable action-description language; sending the compiled data comprising human-readable action-description language from the script compiler of the server to a developer device; receiving modified data from the developer device; and sending the modified data from the developer device to the test device.

17 Claims, 7 Drawing Sheets

(56) References Cited

U.S. PATENT DOCUMENTS

| | | |
|---|---|---|
| 2009/0228970 A1* | 9/2009 | Morimoto ..................... 726/12 |
| 2010/0031196 A1* | 2/2010 | Ordody et al. ............... 715/810 |
| 2010/0095208 A1* | 4/2010 | White ............... G06F 17/30905 |
| | | 715/704 |
| 2011/0078666 A1 | 3/2011 | Altekar |
| 2012/0131473 A1* | 5/2012 | Biron, III ..................... 715/744 |
| 2012/0136921 A1* | 5/2012 | Samdadiya et al. .......... 709/203 |
| 2012/0174069 A1* | 7/2012 | Zavatone ............ G06F 11/3692 |
| | | 717/124 |
| 2012/0174076 A1* | 7/2012 | Rajic ............................. 717/128 |
| 2012/0198476 A1* | 8/2012 | Markuza et al. ............. 719/318 |
| 2012/0239987 A1 | 9/2012 | Chow et al. |
| 2012/0243745 A1* | 9/2012 | Amintafreshi ...... G06F 11/3692 |
| | | 382/103 |

OTHER PUBLICATIONS

"Custom class loader for android?" May 31, 2012, published by Stack Exchange, Inc. at <http://stackoverflow.com/questions/10832029/custom-class-loader-for-android>.*

"Call stack" retrived online Jul. 24, 2015, Published by Wikipedia at <https://en.wikipedia.org/wiki/Call_stack>.*

* cited by examiner

SYSTEM, METHOD, AND APPARATUS FOR AUTOMATIC RECORDING AND REPLAYING OF APPLICATION EXECUTIONS

BACKGROUND

The exemplary embodiments of this invention relate generally to testing and replay systems for applications on computing devices such as mobile devices and, more particularly, to systems, methods, and apparatuses for recording user actions and producing executable tests in the form of human-readable scripts that can be modified to create new tests.

Application development has proliferated in recent years due to an increase in the number and capabilities of handheld and tablet devices. The number of applications created and downloaded has resulted in a robust global ecosystem of software creation, application deployment, and revenue generation. The adoption of such applications has not been limited to consumers; enterprise deployment of mobile applications targeted at customers, clients, and internal employees has become widespread as companies compete for advantage despite economic challenges.

With an exponential proliferation of applications created for computing devices such as smartphones and tablets, application testing by developers has become widespread. Before an application is deployed and made available to the public, it generally undergoes a period of testing. Without such a period of testing, risks that may compromise the marketability of the application may be incurred. For example, the application may receive negative reviews and be bypassed by alternative competitive offerings immediately available to potential end users. Such an outcome motivates the desire for a testing process that gives application developers the flexibility to record all the states of an application execution and to provide playback capabilities to replicate application changes and outcomes up to any given state of interest.

Applications for computing devices pose an interesting challenge to developers. They are designed and developed in non-mobile environments, and tested either on special emulators that replicate a computing system, a mobile operating system, or on an actual mobile device. When attempting to resolve an error or bug, a developer typically uses a proprietary development kit to set breakpoints and debug code step by step. However, this approach is limited, as it does not account for field testing, which allows for testing an application in the actual context in which it will be used. For mobile applications, field testing is useful since emulators cannot always replicate the exact conditions under which an application will execute on a real device.

SUMMARY

In one exemplary aspect, a method comprises recording an interaction between a test device operating system and an application, the interaction being based on a user input; and sending the recorded interaction between the test device operating system and the application to a server.

In another exemplary aspect, a method comprises receiving, on a developer electronic device, data from a server, the data comprising human-readable action-description language from a script compiler of the server; modifying the human-readable action-description language from the script compiler on the developer electronic device; and returning the modified compiled script from the developer electronic device to the server. The data pertains to a test created by recording an interaction on a remotely-located testing electronic device.

In another exemplary aspect, a method comprises receiving data pertaining to a recorded interaction between a test device operating system and an application on a test device, the recorded interaction being based on a user input; compiling the data pertaining to the recorded interaction in a script compiler, the data comprising human-readable action-description language; sending the compiled data comprising human-readable action-description language from the script compiler of the server to a developer device; receiving modified data from the developer device; and sending the modified data from the developer device to the test device.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

Figure 1:
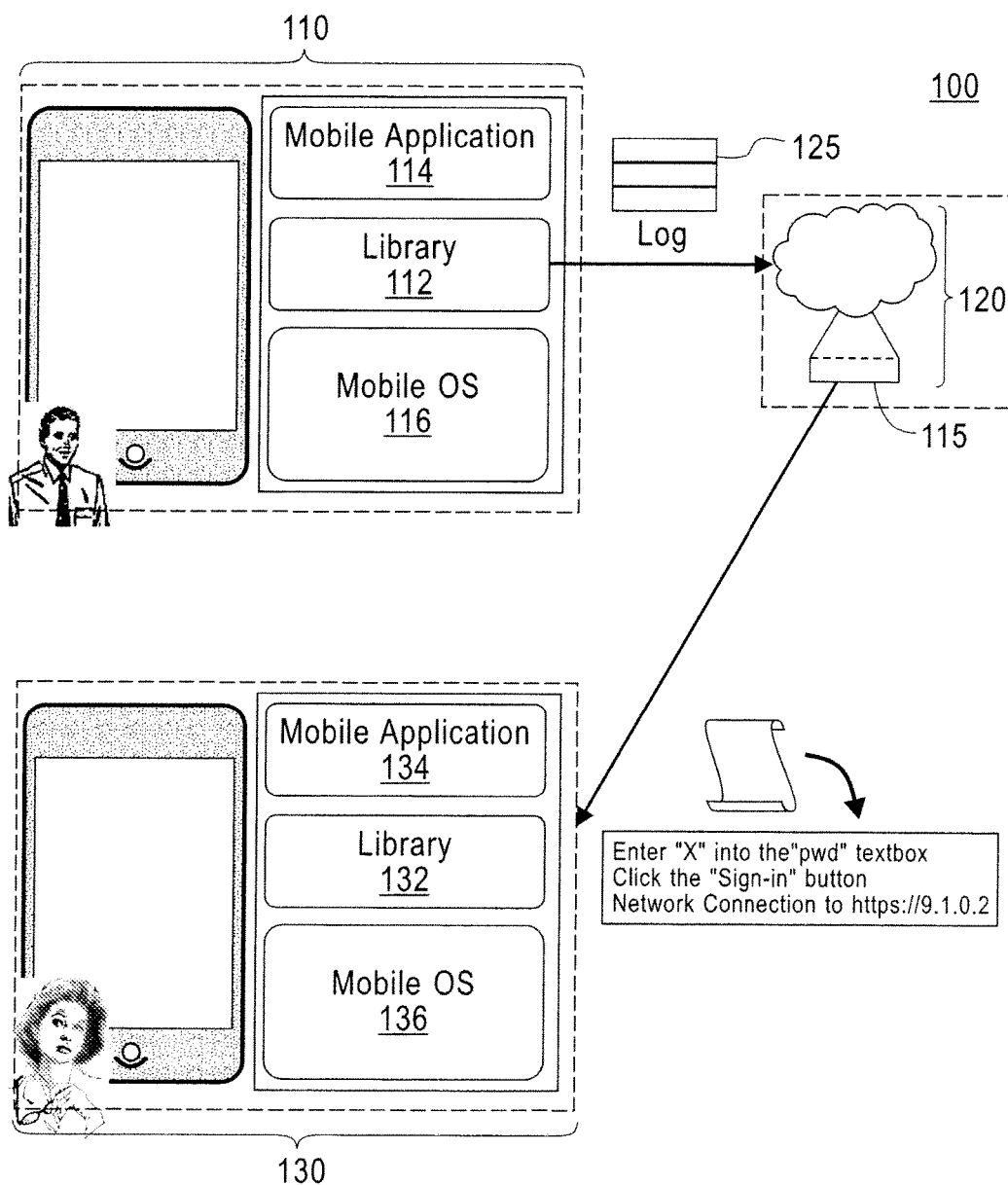
FIG. 1 is a schematic illustration of one exemplary embodiment of a system architecture illustrating interactions between various devices.

The exemplary embodiments disclosed herein are directed to systems, methods, and apparatuses for the automatic recording and replaying of application executions. Such systems, methods, and apparatuses involve the generation and replay of test scripts, which can then be deployed on devices (e.g., phones, tablets, computers, robotic surgery equipment, and the like, which are hereinafter collectively referred to as "devices") for field testing. In field testing the test scripts, user actions (e.g., deterministic input such as user input) can be replayed on a variety of devices operating in different environmental contexts to verify behaviors of the applications in the real world. In the field testing, high-fidelity replay is less of a concern than is the ease of test creation and scalability. From the perspective of an industrial tool designed for mobile-application testing, it should be noted that most mobile applications are driven by multiple tactile user interactions. Thus, capturing and replaying those interactions within an application is sufficient, in most cases, to replicate a state of interest, such as an operation failure or the presence of a bug.

The systems, methods, and apparatuses disclosed herein also capture many types of non-deterministic inputs and the contexts around them such as timer events (e.g., time of day), location, and network data (e.g., connectivity status, state of device, ambient conditions, battery level, and the like) in support of deterministic replay scenarios where debugging may be the goal. However, the level of complexity and overhead that would be added to fully support logging and replaying environmental, nondeterministic events goes beyond the criteria for an industrial mobile application testing tool. In fact, the systems, methods, and apparatuses disclosed herein are based on the principle that lower-fidelity replay is already sufficient to discover most bugs in mobile applications, and higher-fidelity replay can be enabled incrementally when desired.

The architecture of the systems, methods, and apparatuses disclosed herein is based on various design goals, namely, transparency, ease of use, and diverse replay fidelities. In efforts to meet these goals, the tests are replayed on unmodified devices (e.g., devices that are neither rooted nor jailbroken). With regard to transparency, the systems, methods, and apparatuses can be injected into applications with minimal or no source code modifications. Developers do not need to manually annotate their code or issue special system commands to enable logging and replay. In one exemplary implementation of the systems, methods, and apparatuses into an Android device, access to source code of the application is not required. In another exemplary implementation into an iOS device, a one-line change to the main function of the code of the application is made. The systems, methods, and applications as disclosed herein can also be injected into hybrid applications.

With regard to the ease of use, once injected into an application, the systems disclosed herein overlay a record and replay a user interface (UI) on the application. This UI can then be used to drive the generation of trace logs and replay them on the device. Tests are then created by recording an interaction of a user (e.g., a tester) with the device. The tests are encoded in a human-readable action-description language from an open source JAVA script compiler (e.g., CLEARSCRIPT) that can be modified to create new tests.

With regard to diverse replay fidelities, suitable fidelity of replay depends on the testing goals. Higher fidelity replays may incur additional costs but are more effective at determining causes for bugs, while lower fidelity replays may be cheaper to generate and still appropriate for testing code coverage. The underlying logging component of the exemplary systems, methods, and apparatuses disclosed herein instruments arbitrary application code and can be configured to create different levels of replay fidelity.

Thus, the system architecture is configured to allow for the transparent, easy, and diverse field testing of the test scripts. From an architectural perspective, testers can add the system to any native mobile application. Enablement of the field testing is achieved by encapsulating client-side components of the system into a single library, which is then injected as a subsystem into an existing application. Injecting the subsystem is achieved differently on different systems.

Referring to FIG. 1, one exemplary embodiment of a system illustrating interactions between various devices is designated generally by the reference number 100 and is hereinafter referred to as "system 100." In system 100, an apparatus such as a test device 110 is linked to an apparatus such as a server 120. The test device 110 includes a system library 112, a testable application 114, and a test device operating system 116. The system library 112 operates as an intermediary between the testable application 114 and the test device operating system 116 and includes component definitions of one or more mobile framework classes, which serve to wrapper instantiated objects from a call stack when the testable application 114 is run.

User input is entered into the test device 110 to access the testable application 114. As the testable application 114 is run, method invocations on the test device operating system 116 are intercepted by the system library 112 and are processed by wrapped objects during execution in real time. These intercepted invocations contain all the associated parameters that are utilized for method execution. The invocations are logged as interactions into a memory of the test device 110 as the invocation is passed to the testable application 114 for processing. Upon completion of the processing, any returnable response is logged into the memory of the test device 110 using a logging function, and the response is returned back to the calling object (e.g., the test device operating system 116), thereby preserving the call stack.

The system 100 also includes an apparatus such as a developer device 130 remotely-located from the test device 110. The developer device 130 is similar to the test device 110 and includes a system library 132, a developer application 134, and a developer device operating system 136. The system library 132, the developer application 134, and the developer device operating system 136 are configured to operate similar to the relevant corresponding elements of the test device 110 and are further configured to monitor the events (e.g., the invocations) during execution of the testable application 114. During testing, data is transferred from the system library 112 of the test device 110 to the server 120 and logged (e.g., using recording log 125). In the server 120, the data is encoded in a compiler 115 and transferred to the system library 132 of the developer device 130. The data transferred to the developer device 130 is encoded in the human-readable action-description language from the compiler 115 and modified by the developer on the developer device 130 to create new tests that can be returned back through the server 120 to the test device 110 to simulate the user input to the test device 110. Modification of the human-readable action-description language includes, but is not limited to, modification of credentials in the script by a tester (e.g., to test if a username/password dialog screen is working correctly).

In one exemplary embodiment, the data transferred from the test device 110 to the server 120 and subsequently to the developer device 130 are logged in the recording log 125 as recorded interactions in the form of the human-readable action-description language from the compiler. This logging is line-by-line encoding of the human-readable action-description language, which thus allows the compiler 115 in the server 120 to act as a validator of the recording log 125.

In another exemplary embodiment, the data transferred may be a compressed form of a text-based standard (e.g., JSON (JAVASCRIPT Object Notation)) that outlines captured events as objects, each object being converted to the human-readable action-description language by the compiler 115 at the server 120. However, for security purposes the system 100 could be enabled to send the data to and from the test device 110, the server 120, and the developer device 130 in a format that can be used to obfuscate the recorded transactions in order to inhibit or at least minimize the chances of interception.

Figure 2:
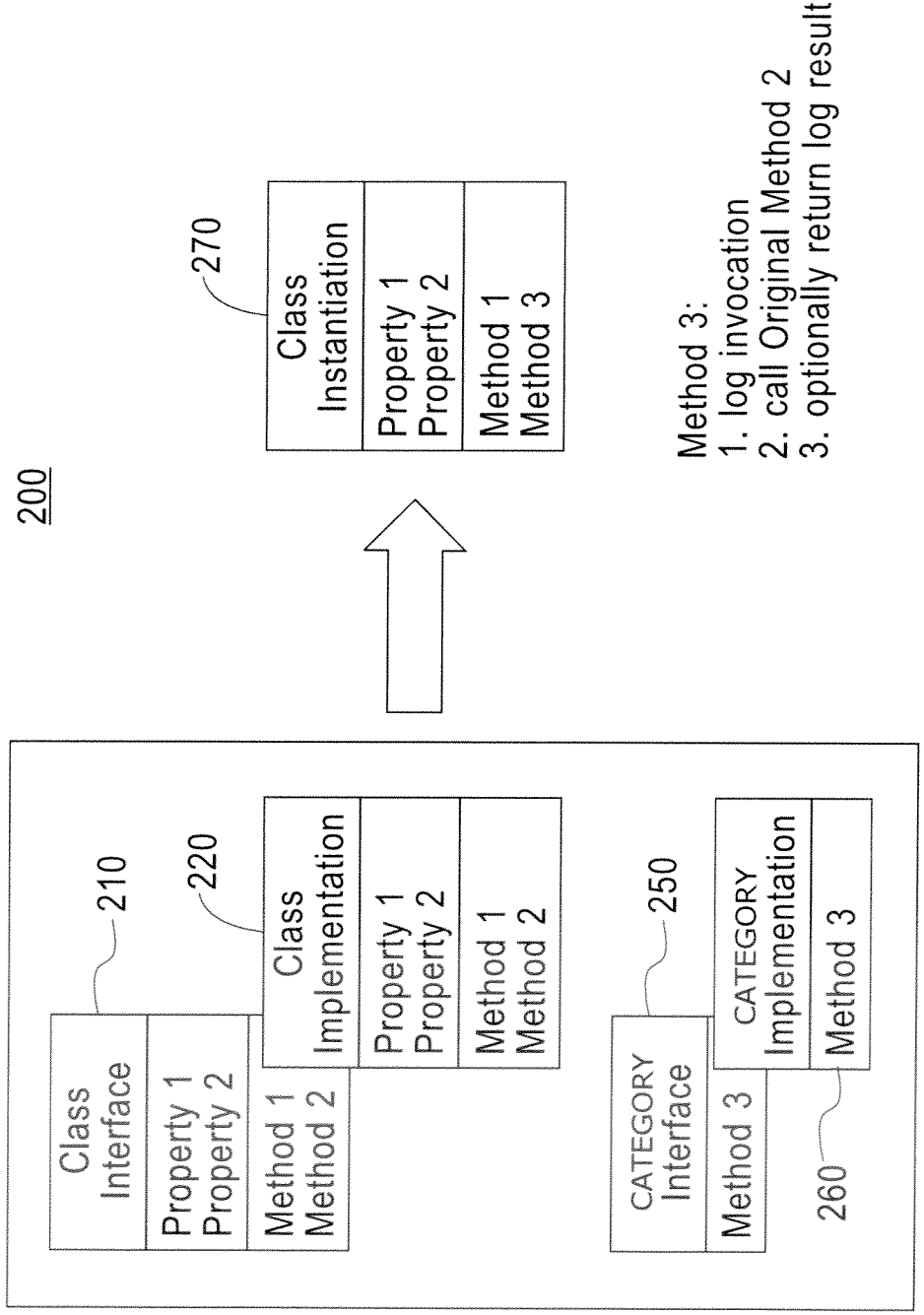
FIG. 2 is a schematic illustration of one exemplary embodiment of an implementation of instrumentation in the system architecture of FIG. 1 on an iOS platform.

Referring now to FIG. 2, one exemplary embodiment of implementing instrumentation in the architecture of the system 100 on an iOS platform is designated generally by the reference number 200 and is hereinafter referred to as "iOS system 200." In the iOS system 200, native applications created for an iOS platform can be written using Objective-C, which is a dynamic language that allows code adaptation at run time. The system 100 achieves instrumentation of application code by using Objective-C categories and method swizzling (e.g., changing parameter register order while calling an operation).

In the iOS system 200, a given Objective-C class consists of both an interface definition and associated implementation. Typically, an object is created based on these definitions. In particular, a class interface 210 comprises properties (e.g., Property 1 and Property 2) and methods (e.g., Method 1 and Method 2). A class implementation 220 is used to provide a template using the properties and methods, thereby defining what data representations represent which attributes.

Additionally, Objective-C allows a developer to modify a class definition via a category. Categories are much like normal class definitions with an interface and implementation but serve to modify an existing class. A category can be used for any class in Objective-C and does not require access to source code to be recompiled. A category interface 250 is declared to comprise a method (e.g., Method 3). This method is implemented in a category implementation 260.

A category is defined for the sample class definition where Method 3 overrides Method 2 in the original class definition. When the class is instantiated (in a class instantiation 270) at run time, the category augments the class with Method 3. For the system library 112, Method 3 is a wrapper over Method 2. However, when Method 3 is called, Method 3 creates a log item capturing all collected data. Furthermore, Method 3 uses method swizzling in Objective-C to call the original Method 2. Additionally, Method 3 can return the log result to the caller.

Figure 3:
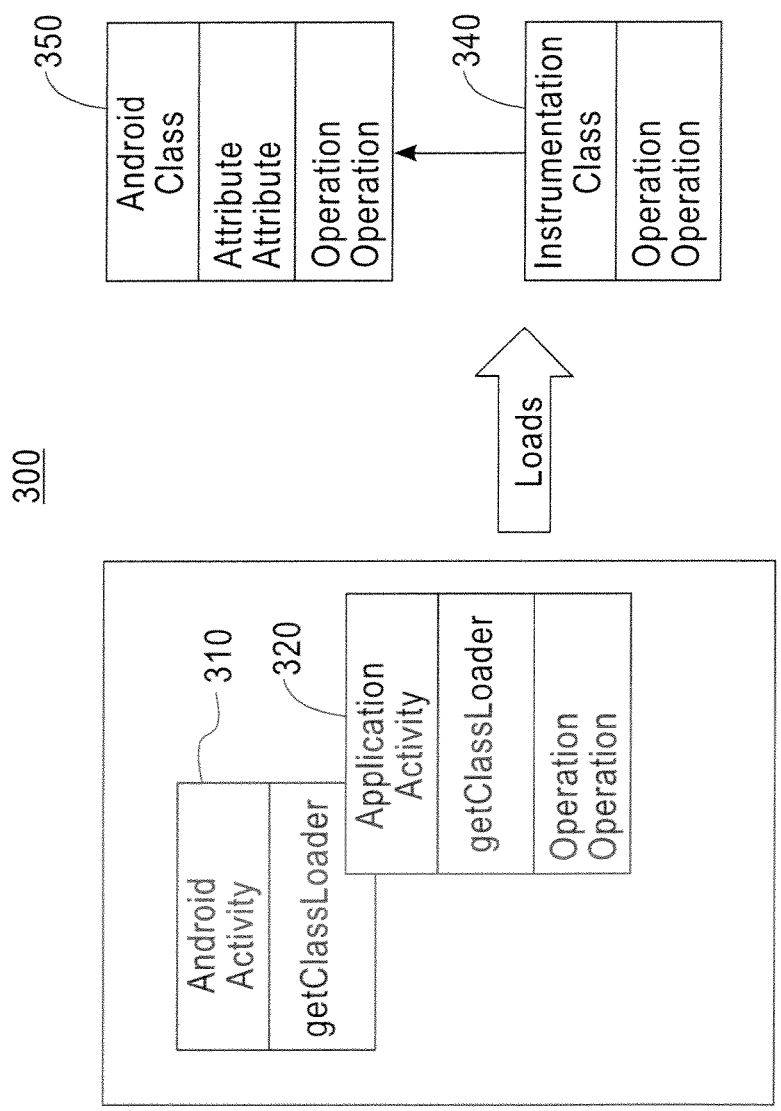
FIG. 3 is a schematic illustration of one exemplary embodiment of an implementation of instrumentation in the system architecture of FIG. 1 on an Android platform.

Referring now to FIG. 3, one exemplary embodiment of implementing instrumentation in the architecture of the system 100 on an Android platform is designated generally by the reference number 300 and is hereinafter referred to as "Android system 300." In the Android system 300, an Android activity 310 allows for creating a custom class loader that can be used in place of a system class loader when loading classes needed by an Android application 320. The system 100 makes use of this by overriding the system class loader with a specialized version that is capable of loading instrumented classes 340 that provide logging and replay operations. If the application is already compiled, the code to override the class loader and the instrumentation library can be bytecode-injected into the application post compile time. At run time, when the specialized class loader is invoked, it checks to see if an instrumented class 340 exists. If it does, the specialized class loader first loads the instrumented class, rather than the system class, and instantiates an instrumented object in its place. An instrumented class is a specialization of an Android class, which is shown at 350. Objects created from instrumented classes inherit application logic from their parent object for most methods. One exemplary exception is that the instrumented object will have the ability to proxy UI events, network data, and application state, and to log this data as part of a data collection that will be sent to a server for translation by the compiler 115. The instrumented object also has the ability to receive commands that allow it to present customized behavior at run time, for example replaying the recorded translation from the compiler 115 on the test device 110.

Figure 4:
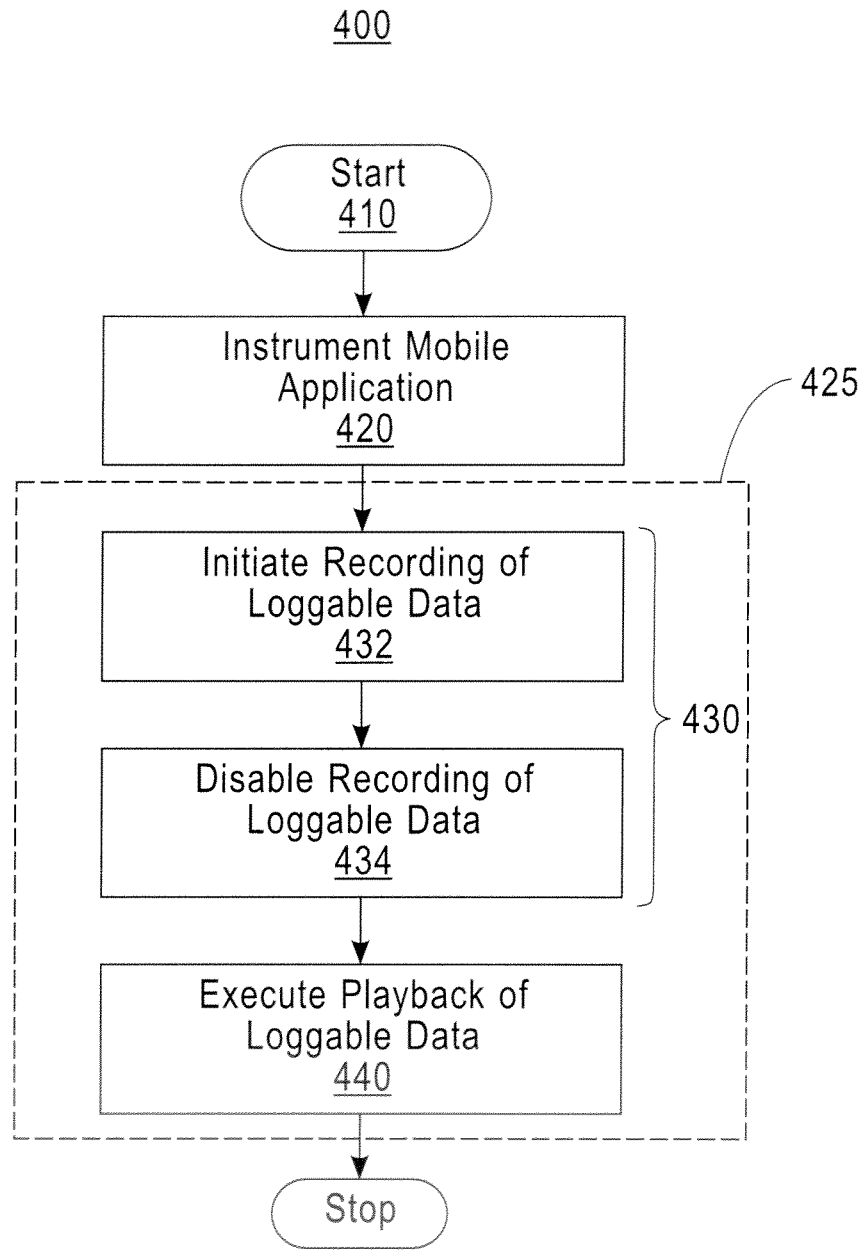
FIG. 4 is a flow chart illustrating one exemplary embodiment of a method of general operation of the system of FIG. 1.

Referring to FIG. 4, one exemplary embodiment of a method of general operation of the system 100 is illustrated at 400 and is hereinafter referred to as "method 400." In method 400, an initiation step 410 is executed, followed by an implementation step 420 in which the method invocations are processed as described above. Subsequent to the implementation step 420, a routine 425 comprising a two-part logging/scripting step 430 and a playback step 440 is carried out. In the logging/scripting step 430, an application recording phase 432 is carried out in which the recording of loggable data pertaining to the interaction of the tester with the system 100 is initiated, followed by a disablement step 434 in which an intentional disablement of the recording phase 432 is carried out. In the playback step 440, execution/playback of recorded data is carried out by the test device 110.

Figure 5:
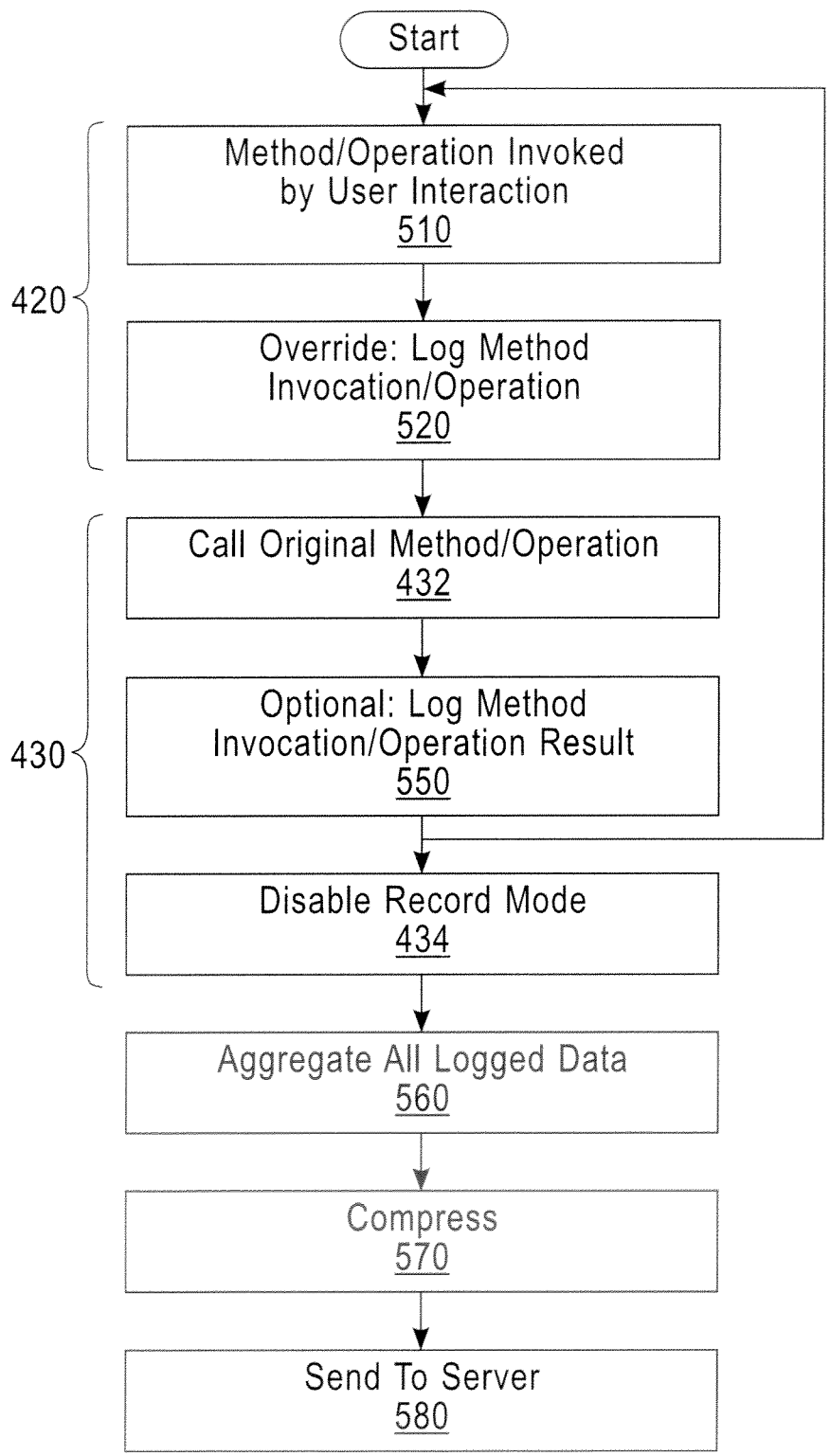
FIG. 5 is a flow chart illustrating one exemplary embodiment of an implementation step, a logging/scripting step, and a playback step of the method of FIG. 4.

Referring to FIG. 5, the implementation step 420, the logging/scripting step 430, and the playback step 440 are described in more detail. In the implementation step 420, the method/operation is invoked by user (e.g., tester) interaction (at an invocation step 510), and an override step 520 is carried out (e.g., where Method 3 overrides Method 2 in the original class definition, as with the iOS system 200, or where a custom class loader can be used in place of the system class loader, as with the Android system 300).

In the logging/scripting step 430, the recording of loggable data is initiated via a predetermined subset of application functions from the system library 112 which call the original method and operation. This recording is tested by first initiating the recording phase 432 of the system 100, which is enabled via a visible overlaid control set. The recording phase 432 allows for a series of method invocations to be executed within the testable application 114, as triggered by interaction with the application. Optionally, a log can be made of the invocation/operation result in an optional result logging step 550. Control may then be passed back to the implementation step 420 as desired.

Upon completion of the recording phase, the developer or tester disables recording via the visible control, which aggregates all of the logged method invocations and relevant responses, in the disablement step 434. All logged data is aggregated in an aggregation step 560. Optionally, the logged data can be compressed and/or encrypted in a compression/encryption step 570. The system library 112 then sends (in a sending step 580) the logged data to the server 120, which catalogs all the logged data (e.g., in the recording log 125) and generates script compiler templates (based on the data encoded in the human-readable action-description language from the compiler 115 and modified by the developer) from the aggregated contents. The testable application 114 is then re-executed in a playback phase based on the recorded interactions of the tester with the system.

Figure 6:
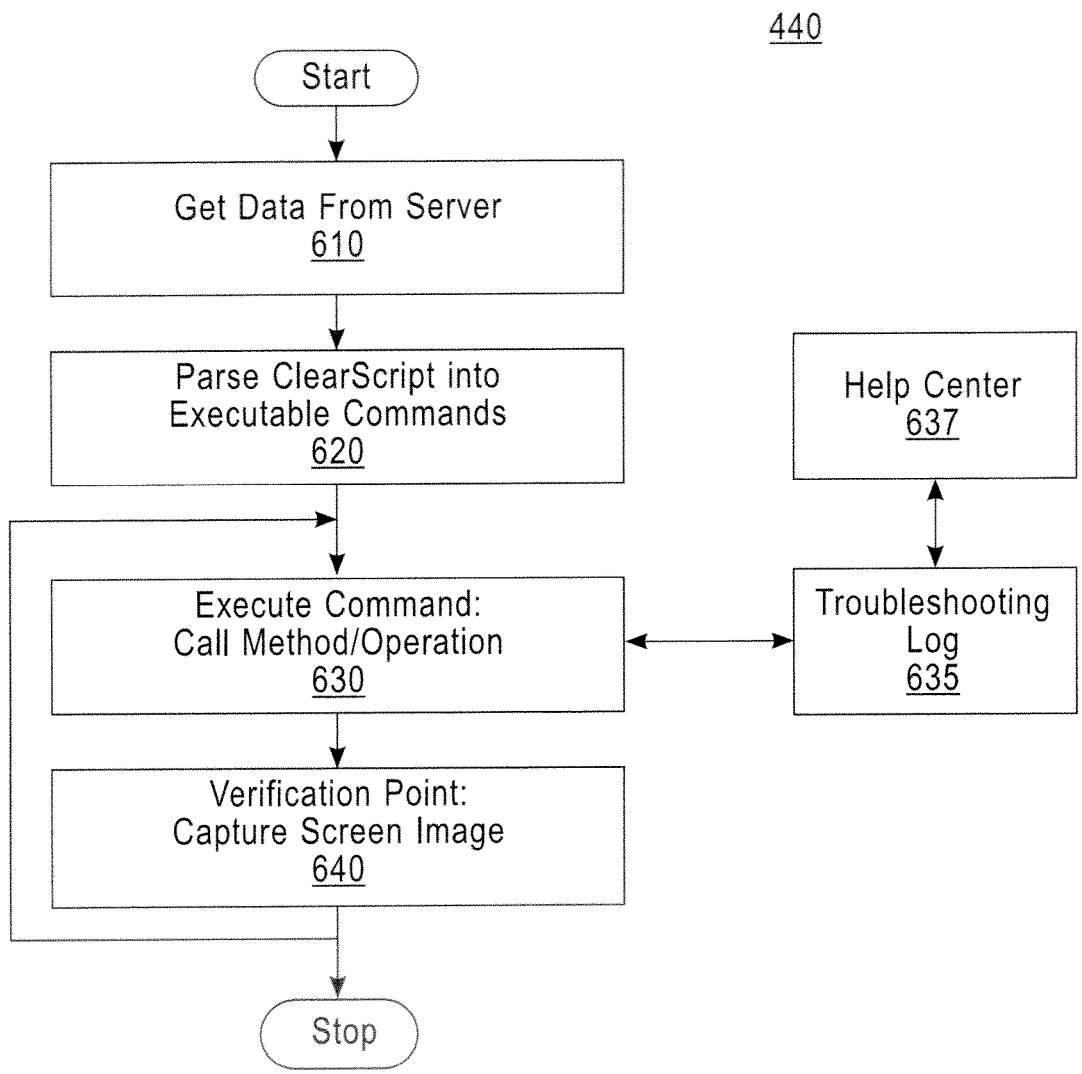
FIG. 6 is a flow chart illustrating one exemplary embodiment of the playback step of the method of FIG. 4.

Referring now to FIG. 6, one exemplary embodiment of the playback step 440 is shown. Playback consists of the system 100 creating a network connection from the test device 110 to the server 120 that stores the test script earmarked for playback. Upon retrieval of a template from the server 120 in a retrieval step 610, the system 100 parses the script template into executable commands in a parsing step 620.

Each entry is then executed in sequence by the system library 132 in an execute command step 630 in order to simulate the tester input based on the monitored events to run the application without tester input to cause the testable application 114 to replicate a state of interest, such as an operation failure or the presence of a bug. In simulating the tester input, a troubleshooting log 635 may be created to facilitate a troubleshooting application (for example, to address issues with regard to performing playback operations), the troubleshooting log 635 being uploadable to a help center 637 for analysis.

In the execute command step 630, executed playback entries are classified in two categories: UI events and non-UI events. The UI events consist of invocations that result from the tester's direct interaction with the interface of the testable application 114. Playback of UI events is accomplished by mapping the details of an event interaction to the object instance targeted as the recipient of the event. For example, the coordinates of a selection event are associated with a subview or widget upon which the event is targeted to interact with. Similarly, playback of non-UI events is accomplished by mapping parameterized values parsed from the script compiler entry information (from the developer) to a targeted instance of an application object that can handle the execution and response of the targeted invocation. Examples consist of initialized network requests for accessing data outside of the running testable application 114 as well as the returned responses. Recorded script compiler templates have the advantage of being easily tractable by a human reader, allowing for simple modifications and testing of various conditions upon replay of the testable application 114.

The system 100 provides the ability to visually capture various stages of recording/replay during testing in a verification step 640. As a developer or tester initiates recording of a template, the option to selectively capture a screenshot is presented via a selection on the overlaid control set. By invoking the screen capture selection, a static capture of the visual screen, including any inputted values, is created and stored in memory. Upon completion of the recording template, all captured screen images can optionally be stored on the test device 110 itself or sent to the server 120. Accordingly, during the playback phase of testing, "verification points" can be constructed by capturing screen images of the playback results of the testing. These captured images can be compared to those stored during the initial recording of the testing template, thereby allowing for an accurate visual representation of both the recorded phases and the playback phases of the application provided, which in turn allows for an accurate visual comparison. At the close of the verification step 640, control may be returned to the execute command step 630.

One advantage of the system 100 is the ability to introspect and test not only native applications, but hybrid applications as well. Hybrid applications run natively but host Web-based content using an embedded Web view to render the Web-based components. The system 100 provides an intermediary layer that wrappers the embedded Web view. Specifically, the system 100 inserts specialized JavaScript testing library code into the wrapped Web view, which executes upon initiation of any subsequent Web-rendering operation. The JavaScript testing library is responsible for capturing the state of all objects within the Web view and passing the state of any specified Web components to the higher-level native system library 112. This allows for an entry to be created and logged in an identical manner as with previously described UI and non-UI native events. The system 100 translates Web events into loggable entries, and subsequent playback of the script compiler templates results in the wrapped Web container conveying translated Web events to the injected testing library for execution on targeted Web objects.

Figure 7:
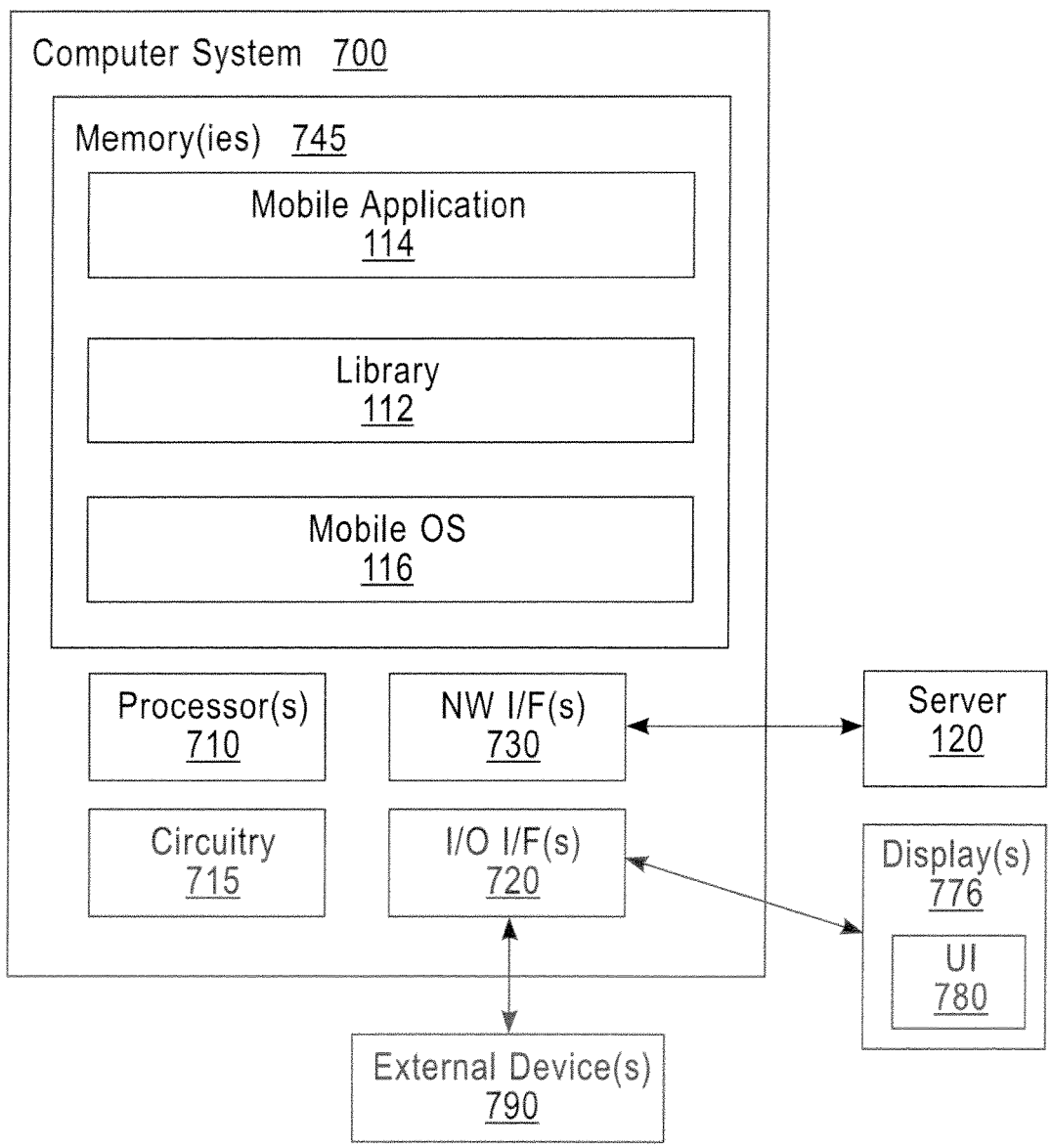
FIG. 7 is a flow chart illustrating one exemplary system for performing the exemplary embodiments described herein.

Referring now to FIG. 7, an overview of a computing system incorporating the test device 110 and being suitable for use with the exemplary embodiments described herein is designated generally by the reference number 700 and is hereinafter referred to as "computing system 700." The computing system 700 comprises one or more memories 745, one or more processors 710, one or more I/O interfaces 720, and one or more wired or wireless network interfaces 730. This example includes the testable application 114, the system library 112, and the test device operating system 116. The server 120 may be connected to the computing system 700 through the network interfaces 730. Alternatively or in addition to the one or more processors 710, the computing system 700 may comprise circuitry 715. The computing system 700 may be coupled to or include one or more displays 776 and one or more external device(s) 790. The operations may also be performed, in part or completely, by the circuitry 715 that implements logic to carry out the operations. The circuitry 715 may be implemented as part of the one or more processors 710 or may be separate from the one or more processors 710. The processors 710 may be any processing unit, such as a digital signal processor and/or single-core or multi-core general purpose processors. The circuitry 715 may be any electronic circuit such as an application specific integrated circuit or programmable logic. The memories 745 may comprise non-volatile and/or volatile RAM, cache memory, NAND-based flash memory, long term storage (e.g., hard drive), and/or read only memory. The one or more I/O interfaces 720 may include interfaces through which a user may interact with the computing system 700. The display(s) 776 may be a touchscreen, flatscreen, monitor, television, projector, as examples.

A user interacts with the computing system 700 through a UI 780 in an exemplary embodiment or through the network interface(s) 730 in another non-limiting embodiment. The external device(s) 790 enable a user to interact in one exemplary embodiment with the computing system 700 and may include a mouse, trackball, keyboard, or the like. The network interfaces 730 may be wired or wireless and may implement a number of protocols, such as cellular or local area network protocols. The elements in computing system 700 may be interconnected through any technology, such as buses, traces on a board, interconnects on semiconductors, or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method, comprising:
   recording an interaction between a test device operating system and an application, the recording of the interaction being by an initiating of the recording of a template to capture a first screenshot of the test device, the interaction being based on a user input from a user;
   wherein the recording of the interaction comprises intercepting at least one method invocation based on the user input, processing the method invocation using wrapped instantiated objects from a call stack, overriding at least one instantiated object with a category implementation, calling the category implementation, logging data using the called category implementation, the logged data pertaining to the interaction of the user with the test device operating system in an application recording phase, testing each of the at least one method invocations in a series of method invocations from the called category implementation, capturing a second screenshot of a result of the testing, visually comparing the first screenshot with the second screenshot, constructing verification points, aggregating the tested method invocations, and returning the data to the test device operating system to preserve the call stack;
   wherein the instantiated objects are class implementations wrapped in the category implementations;
   sending the recorded interaction between the test device operating system and the application to a server; and
   testing an initiation of the application recording phase using a visible overlaid control set;
   compiling data pertaining to the recorded interaction in a script compiler of the server, the data comprising human-readable action-description language;
   sending the compiled data comprising human-readable action-description language from the script compiler of the server to a developer device;
   returning modified data from the developer device to the server;
   wherein data pertaining to the recorded interaction is compressed as a text-based standard that outlines captured events as objects, wherein the compressed data is formatted to obfuscate the recorded interaction.

2. The method of claim 1, further comprising intentionally disabling the application recording phase.

3. The method of claim 1, further comprising compiling a script from compiler templates based on encoded data pertaining to the recorded interaction.

4. The method of claim 1, further comprising re-executing the application based on the recorded interaction between the test device operating system and the application sent to the server to simulate the user input.

5. The method of claim 4, wherein re-executing the application comprises creating a network connection from the test device to a server, retrieving a script from the server, and parsing the script into executable commands.

6. The method of claim 1, wherein recording the interaction comprises overriding a class interface method with a category interface method by wrapping over the class interface method.

7. The method of claim 1, further comprising bytecode-injecting code to override a class loader and an instrumentation library post compile time by loading an instrumented class and instantiating an instrumented object.

8. The method of claim 1, further comprising creating a troubleshooting log to facilitate a troubleshooting application.

9. The method of claim 8, further comprising uploading the troubleshooting log to a help center for analysis.

10. The method of claim 1, wherein the interaction between the test device operating system and the application includes one or more of a deterministic event and a non-deterministic event.

11. The method of claim 1, wherein the recording is carried out through a testing library.

12. A method, comprising:
receiving, on a developer electronic device, data from a server, the data comprising human-readable action-description language from a script compiler of the server;
modifying the human-readable action-description language from the script compiler on the developer electronic device; and
returning a modified compiled script from the developer electronic device to the server;
wherein the data pertains to a test created by recording an interaction on a remotely-located testing electronic device by initiating a recording of a template to capture a first screenshot of the testing electronic device;
wherein the recording of the interaction comprises intercepting at least one method invocation based on a user input, processing the method invocation using wrapped instantiated objects from a call stack, overriding at least one instantiated object with a category implementation, calling the category implementation, logging data using the called category implementation, the logged data pertaining to the interaction, testing each of the at least one method invocations in a series of method invocations from the called category implementation using a visible overlaid control set, capturing a second screenshot of a result of the testing, visually comparing the first screenshot with the second screenshot, constructing verification points, aggregating the tested method invocations, and returning the logged data pertaining to the interaction to the remotely-located testing electronic device to preserve the call stack;
wherein the instantiated objects are class implementations wrapped in the category implementations;
wherein data pertaining to the interaction is compressed as a text-based standard that outlines captured events as objects, wherein the compressed data is formatted to obfuscate the recorded interaction.

13. The method of claim 12, further comprising monitoring an interaction on the remotely-located testing electronic device prior to receiving the human-readable action-description language on the developer electronic device.

14. The method of claim 12, wherein modifying the human-readable action-description language comprises creating test data pertaining to a second test.

15. The method of claim 12, further comprising transferring the modified compiled script from the server to the remotely-located testing electronic device.

16. A method, comprising:
compressing data pertaining to a recorded interaction as a text-based standard that outlines captured events as objects, wherein the compressed data is formatted to obfuscate the recorded interaction;
receiving data pertaining to the recorded interaction between a test device operating system and an application on a test device, the recording of the interaction being by an initiating of the recording of a template to capture a first screenshot of the test device, the recorded interaction being an invocation in a series of invocations based on a user input that is processed using wrapped instantiated objects from a call stack, wherein the recorded interaction further comprises an override of at least one instantiated object with a category implementation and a call based on the category implementation, and from which data using the called category implementation is logged, tested using a visible overlaid control set, and aggregated and returned to the test device to preserve the call stack, the instantiated objects being class implementations wrapped in the category implementations;
compiling the data pertaining to the recorded interaction in a script compiler of a server, the data comprising human-readable action-description language;
sending the compiled data comprising human-readable action-description language from the script compiler of the server to a developer device;
receiving modified data from the developer device; and
sending the modified data from the developer device to the test device;
wherein the tested data is captured using a second screenshot of a result of the testing, visually compared to the first screenshot, and verification points are constructed prior to aggregation of the tested data.

17. The method of claim 16, further comprising logging the recorded interaction in a recording log as line-by-line encoding of human-readable action-description language.

* * * * *